US012217721B2

(12) United States Patent
Heo et al.

(10) Patent No.: US 12,217,721 B2
(45) Date of Patent: Feb. 4, 2025

(54) MURA INSPECTION DEVICE FOR COMPRESSING MURA DATA THROUGH DIMENSIONALITY REDUCTION, OPERATING METHOD, AND DISPLAY SYSTEM INCLUDING THE SAME

(71) Applicant: SAMSUNG ELECTRONICS CO., LTD., Suwon-si (KR)

(72) Inventors: Pil-Seung Heo, Seoul (KR); Se Whan Na, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 17/953,624

(22) Filed: Sep. 27, 2022

(65) Prior Publication Data

US 2023/0148119 A1 May 11, 2023

(30) Foreign Application Priority Data

Nov. 11, 2021 (KR) ........................ 10-2021-0154970
Feb. 10, 2022 (KR) ........................ 10-2022-0017814

(51) Int. Cl.
*G09G 5/00* (2006.01)

(52) U.S. Cl.
CPC ..... *G09G 5/003* (2013.01); *G09G 2300/0465* (2013.01); *G09G 2320/0233* (2013.01); *G09G 2320/029* (2013.01)

(58) Field of Classification Search
None
See application file for complete search history.

(56) References Cited

U.S. PATENT DOCUMENTS

| | | | | |
|---|---|---|---|---|
| 9,837,013 | B2 | 12/2017 | Su et al. | |
| 10,217,408 | B2 | 2/2019 | Tsuchida | |
| 10,224,955 | B2 | 3/2019 | Tao et al. | |
| 10,276,112 | B2 | 4/2019 | Zhang | |
| 10,347,220 | B1 | 7/2019 | Jiang et al. | |
| 2007/0229480 | A1 | 10/2007 | Ookawara | |
| 2016/0012759 | A1* | 1/2016 | Kim | G01N 21/956 345/89 |
| 2020/0005693 | A1* | 1/2020 | Furihata | G09G 3/006 |
| 2021/0134221 | A1 | 5/2021 | Berget et al. | |
| 2021/0405794 | A1* | 12/2021 | Shepelev | G06F 3/0412 |
| 2022/0172664 | A1* | 6/2022 | Park | G09G 5/10 |

* cited by examiner

*Primary Examiner* — Andre L Matthews
(74) *Attorney, Agent, or Firm* — Fish & Richardson P.C.

(57) ABSTRACT

A mura inspection device may include; an optical meter configured to measure luminance of a display region and generate a first luminance matrix, a luminance preprocessor configured to detect a distortion region of the display region in relation to the first luminance matrix, and generate a second luminance matrix by adjusting luminance of the distortion region, a mura generator configured to generate a mura matrix in relation to a difference between the second luminance matrix and a reference value, and an encoder configured to generate encoding data by applying dimensionality reduction to the mura matrix.

17 Claims, 8 Drawing Sheets

MURA INSPECTION DEVICE FOR COMPRESSING MURA DATA THROUGH DIMENSIONALITY REDUCTION, OPERATING METHOD, AND DISPLAY SYSTEM INCLUDING THE SAME

CROSS-REFERENCE TO RELATED APPLICATIONS

This application claims priority under 35 U.S.C. § 119 to Korean Patent Application No. 10-2021-0154970 filed on Nov. 11, 2021 and Korean Patent Application No. 10-2022-0017814 filed on Feb. 10, 2022, the collective subject matter of which is hereby incorporated by reference in their entirety.

BACKGROUND

Embodiments of the inventive concept relate generally to mura inspection devices. More particularly, embodiments of the inventive concept relate to mura inspection devices compressing a mura matrix through dimensionality reduction.

Display devices convert received information into a corresponding visual image. The nature of such information may vary by application, but it is usually expressed (or defined) by one or more electrical signals. In this regard, some display devices may use light-emitting pixels arranged in a display panel to display an image in response to an electrical signal. However, some display devices may include a distortion region (e.g., a curved portion or a non-emission region).

In an ideal display panel, each of the constituent pixels should emit (or express) the same luminance level in response to a same electrical signal. However, the pixels of real-world display panels often fail in this regard due to a number of factors, such as environmental conditions, variations in manufacturing processes, etc. Accordingly in relation to luminance, for example, a display device may suffer from a phenomenon known as mura. Here, the term "mura" is a Japanese word that may be understood in some aspects as meaning: unevenness, irregularity or nonuniformity.

SUMMARY

Embodiments of the inventive concept provide mura inspection devices capable of compressing a mura matrix through dimensionality reduction, related operating methods, and display systems including same.

According to an embodiment of the inventive concept, a mura inspection device may include; an optical meter configured to measure luminance of a display region and generate a first luminance matrix, a luminance preprocessor configured to detect a distortion region of the display region in relation to the first luminance matrix, and generate a second luminance matrix by adjusting luminance of the distortion region, a mura generator configured to generate a mura matrix in relation to a difference between the second luminance matrix and a reference value, and an encoder configured to generate encoding data by applying dimensionality reduction to the mura matrix.

According to an embodiment of the inventive concept, a display system may include; a display device including a display region, and a mura inspection device. The mura inspection device be configured to: measure luminance of the display region to generate a first luminance matrix including first elements having respective raw luminance values; detect a distortion region of the display region in relation to the first luminance matrix; adjust luminance of the distortion region to generate a second luminance matrix; generate a mura matrix in relation to a difference between the second luminance matrix and a reference value; generate encoding data by applying dimensionality reduction to the mura matrix; and communicate the encoding data to the display device.

According to an embodiment of the inventive concept, a method of operating a mura inspection device measuring luminance of a display region may include; generating a first luminance matrix of the display region, wherein the first luminance matrix includes first elements having respective, raw luminance values, detecting a distortion region of the display region in relation to the first luminance matrix, adjusting a luminance of the distortion region to generate a second luminance matrix, generating a mura matrix in relation to a difference between the second luminance matrix and a reference value, and generating encoding data by applying dimensionality reduction to the mura matrix.

BRIEF DESCRIPTION OF THE DRAWINGS

Advantages, benefits, and features, as well as the making and use of the inventive concept, will become apparent upon consideration of the following detailed description together with the accompanying drawings, in which.

DETAILED DESCRIPTION

Throughout the written description and drawings like reference numbers and labels denote like or similar elements, components, features and/or methods steps.

Figure 1:
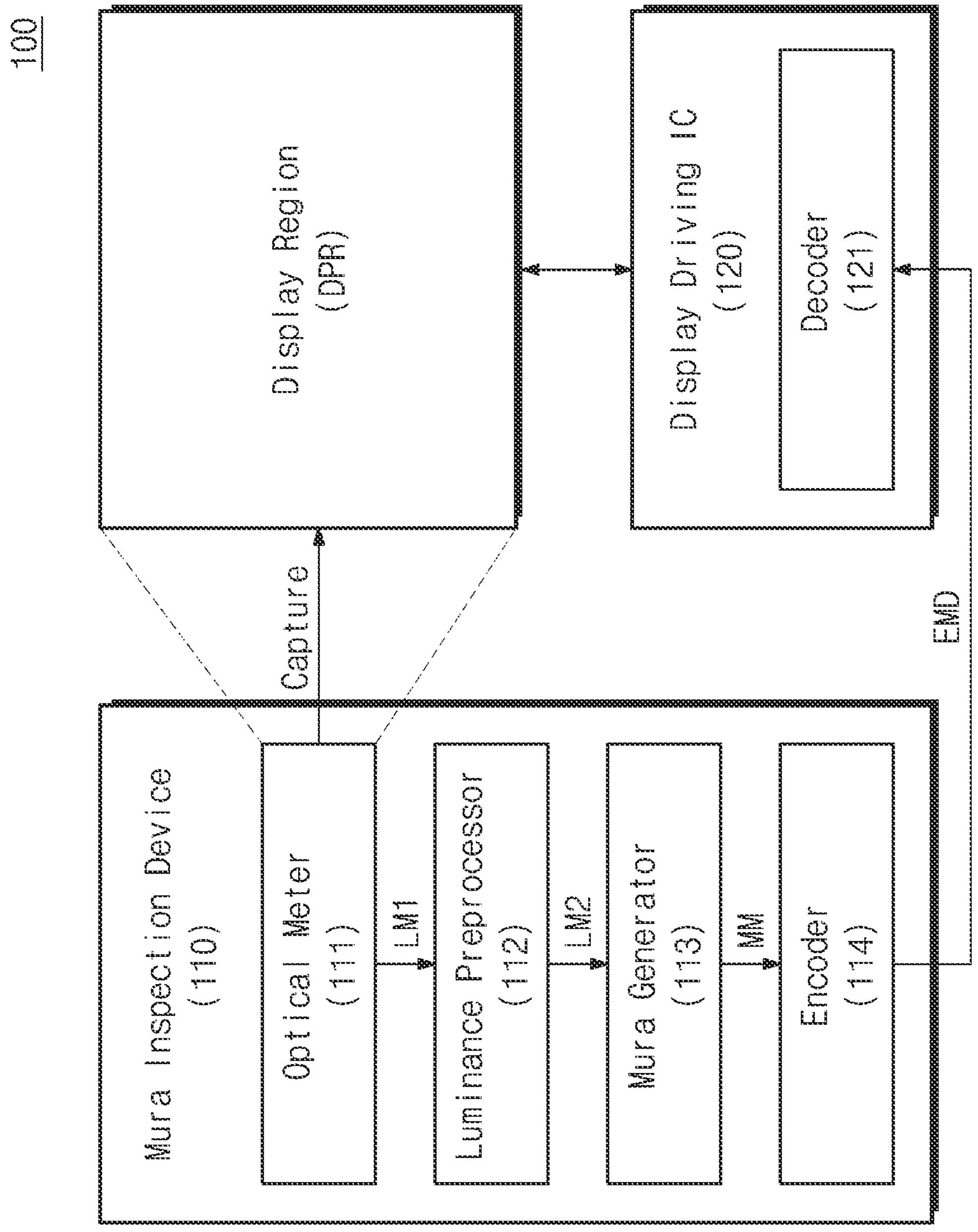
FIG. 1 is a block diagram illustrating a display system according to embodiments of the inventive concept.

Figure (FIG. 1) is a block diagram illustrating a display system 100 according to embodiments of the inventive concept. Referring to FIG. 1, the display system 100 may include a display region (DPR), a mura inspection device 110, and a display driving integrated circuit 120. In this regard, the display system 100 may perform a mura inspection method that extracts (or generates) information necessary to compensate for mura defect(s) (or blemish(s)) occurring in the display region. In some embodiments, a mura inspection method may include (1) capturing an image from the display region (hereafter, a "captured result"), and then (2) generating a mura matrix (MM) corresponding to the display region based on the captured result. In this regard, the mura matrix may be defined in accordance with a difference between a measured luminance of the display region and an intended luminance associated with the display region's design and operation.

It should be noted here that the display region may generally include an emission region and a non-emission region.

In this regard, the emission region includes light emitting elements. In some embodiments, the emission region may correspond to a display panel including a vast plurality of light emitting elements. A variety of display panels is currently available, such as liquid crystal display (LCD) panels, organic light emitting display (OLED) panels, electrophoretic display panels, or electrowetting display panels. During operation of a display panel, each light emitting element may be controlled to display one color selected from a group of colors (e.g., red, green, blue, and white, or alternately, yellow, cyan, and magenta).

The luminance (or brightness) of an emission region may vary from specification due to manufacturing process variances, optical characteristic of the emission region, etc. Such unevenness of luminance may result in a perceivable display blemish, sometimes referred as mura.

In contrast to the emission region, the non-emission region does not include light emitting elements. Instead, the non-emission region may include a bezel, a notch, a hole in active area (HIAA), etc.

The mura inspection device 110 may generate the mura matrix MM in response to image information (e.g., optical information in a defined bandwidth) associated with (or derived from) the capture result from the display region. Then, the mura inspection device 110 may compress the mura matrix MM to generate encoding data (EMD). In order to generate the capture result and convert the capture result into corresponding encoded data, in some embodiments, the mura inspection device 110 may include an optical meter 111, a luminance preprocessor 112, a mura generator 113, and an encoder 114.

The optical meter 111 may be used to capture an image displayed on the display region and determine (e.g., measure) the luminance of the display region. That is, the optical meter 111 may measure the luminance of the display region and generate a first luminance matrix (LM1), wherein the first luminance matrix LM1 may include multiple first elements (e.g., a number of raw luminance values). In some embodiments, the first elements may respectively correspond to pixels of the display region.

The luminance preprocessor 112 may be used to detect (or identify) one or more distortion region(s) of the display region. Here, a distortion region may include; a portion (or subregion) of the display region not including light emitting elements, or a portion (or subregion) of the display region in which luminance may not be accurately measured (e.g., a portion of the display region having a curved aspect). In this regard, the luminance preprocessor 112 may adjust the luminance of the detected distortion region(s) to generate a second luminance matrix (LM2). Thus, a first luminance similarity between a distortion region and a normal region of the second luminance matrix LM2 may be greater than a second luminance similarity between a distortion region and a normal region of the first luminance matrix LM1. Analogously with the first luminance region LM1, the second luminance matrix LM2 may include multiple second elements (e.g., a number of pre-processed luminance values).

In some embodiments, the second elements of the second luminance matrix LM2 may respectively correspond to the first elements of the first luminance matrix LM1. For example, assuming an example in which the first luminance matrix LM1 includes first elements arranged in an 8×12 matrix, the second luminance matrix LM2 may include second elements arranged in the same 8×12 matrix, such that to first elements respectively correspond to second elements.

The mura generator 113 may be used to generate the mura matrix MM based on the second luminance matrix LM2. For example, the mura generator 113 may generate the mura matrix MM in relation to a difference between the second luminance matrix LM2 and a reference value (e.g., intended luminance value(s) consistent with a design specification). The mura generator 113 may generate a mura value for each second element of the second luminance matrix LM2 by calculating a luminance value difference between a second element of the second luminance matrix LM2 and a reference value. That is, the mura generator 113 may respectively generate mura values corresponding to the second elements by calculating differences between the second (pre-processed) luminance values and the reference value. In this manner, the mura generator 113 may generate the mura matrix MM including mura values respectively corresponding to the second elements of the second luminance LM2.

The encoder 114 may be used to generate the encoding data (EMD) by applying the dimensionality reduction to the mura matrix MM received from the mura generator 113. In some embodiments, the encoder 114 may communicate the encoding data EMD to a decoder 121 in a display driving integrated circuit 120 driving (or controlling) a display device associated wither the display region DPR.

Here, it should be noted that certain lossy compression schemes in which an average of mura values for adjacent elements is calculated are conventionally understood. However, when an associated compression ratio increases, the reliability of the resulting compressed data cannot be maintained by such schemes. In great contrast, the encoder 114 of the mura inspection device 110 of FIG. is based on the tendency of mura values, and accordingly, even though a compression ratio may be increased, the reliability of resulting compressed data may nonetheless be maintained. That is, the encoder 114 may generate the encoding data having a relatively high compression ratio, yet loss of mura values remains low.

The display driving integrated circuit 120 may be used to control the operation of the display region, and may be further used to correct the luminance of an image displayed by the display region in response to the encoding data received from the encoder 114.

For example, the display driving integrated circuit 120 may adjust a magnitude of a signal provided to light emitting element(s) of the display region in response to the encoding data. As such, the display driving integrated circuit 120 may control the display region such that the luminance of the display region DPR is more uniform (or less uneven).

In some embodiments, the display driving integrated circuit 120 may include a decoder 121, wherein the decoder 121 may be used to generate a recovery mura matrix by applying dimension recovery to encoding data. The recovery mura matrix may include recovery mura values respectively corresponding to the elements of the mura matrix MM. That is, the recovery mura values may respectively correspond to the mura values of the mura matrix MM.

It should also be noted that mura inspection device 110 and the display driving integrated circuit 120 (e.g., any one of the luminance preprocessor 112, the mura generator 113, the encoder 114, and the decoder 121) may be variously implemented in software, firmware and/or hardware.

Figure 2:
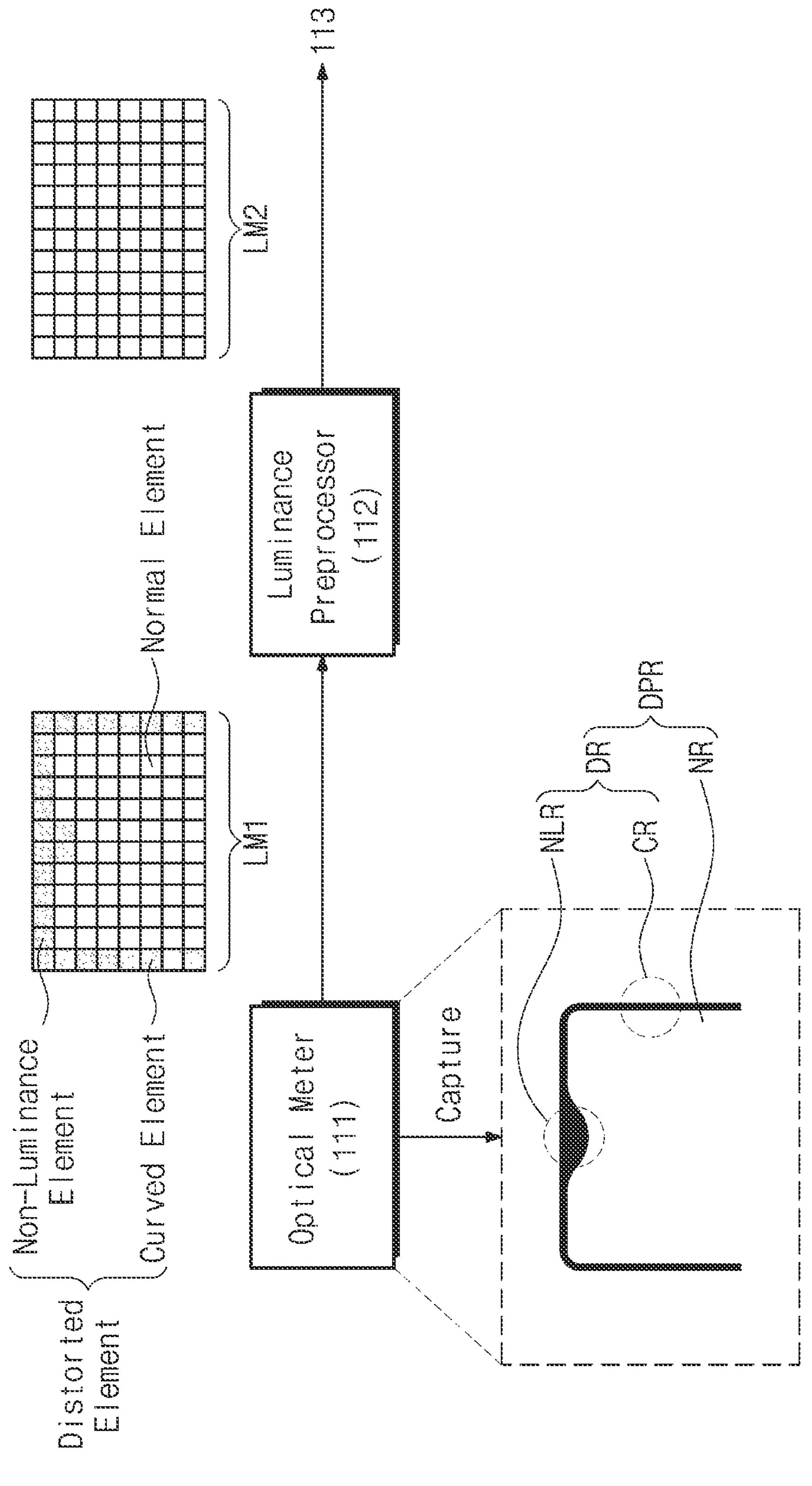
FIG. 2 is a conceptual diagram further illustrating operation of the mura inspection device of FIG. 1.

FIG. 2 is a conceptual diagram further illustrating operation of the mura inspection device 110 of FIG. 1. In particular, the respective generation of the first luminance matrix LM1 by the optical meter 111 and the generation of the second luminance matrix LM2 by the luminance preprocessor 112 are shown.

Referring to FIGS. 1 and 2, the optical meter 111 may capture the display region DPR, including an emission region and a non-emission region NLR, in order to generate the first luminance matrix LM1. Here, it is further assumed that the emission region includes a normal region NR and a curved region CR. In this regard, the normal region NR (e.g., a rigid display) may be understood as a region in which luminance is not distorted and may be measured accurately. In contrast, the curved region CR may be a region in which luminance is distorted due or a region in which luminance cannot be measured accurately due to distortion (e.g., distortion caused by curvature in the display region DPR). For example, the curved region CR may be an edge portion of the display region or a portion of a flexible display and may be referred to as "Youm."

As noted above, the first luminance matrix LM1 may include a plurality of first elements. In FIG. 2, the first luminance matrix LM1 is assumed to include first elements arranged in a 8×12 matrix, as one working example of many possible embodiments of the inventive concept. Here, it is further assumed that the first elements respectively correspond to pixels of the display region DPR.

The luminance preprocessor 112 may detect a distortion region and a normal region within the display region DPR. That is, the luminance preprocessor 112 may determine distorted element(s) from among the plurality of first elements of the first luminance matrix LM1, wherein one or more distorted element(s) correspond to the distortion region, and the luminance preprocessor 112 may also determine normal element(s) from among the plurality of first elements of the first luminance matrix LM1, wherein one or more normal element(s) correspond to the normal region.

For example, the luminance preprocessor 112 may determine that an element is a distorted element, if it has (or correspondingly exhibits) a raw luminance value less than a first reference luminance value. Alternately, the luminance preprocessor 112 may determine that the element is a normal element, if it has a raw luminance value greater than or equal to the first reference luminance value. Here, the first reference luminance value may be defined as a value selected under a first criterion for determining whether a raw luminance value should, or should not be included in an allowable error range. Accordingly, an element having a raw luminance value less than the first reference luminance value may be designated as a distorted element, and an element having a raw luminance value greater than or equal to the reference first luminance value may be designated as a normal element.

When a raw luminance value of a distorted element is less than a second reference luminance value, the luminance preprocessor 112 may further determine that the distorted element as a non-luminance element, where the non-luminance element may be associated with the non-emission region. However, when the raw luminance value of the distorted element is greater than or equal to the second luminance value, the luminance preprocessor 112 may determine that the distorted element as a curved element, where the curved element may be associated with the curved region.

In this regard, the second reference luminance value may be less than the first luminance value, wherein the second reference luminance value may be a value selected under a second criterion for distinguishing non-luminance elements from curved elements. Accordingly, an element having a raw luminance value less than the second reference luminance value may be deemed a non-luminance element, and an element having a raw luminance value greater than or equal to the second reference luminance value may be deemed a curved element.

In some embodiments, the luminance preprocessor 112 may further determine location information for the curved element, and provide the location information to the mura generator 113. Alternately or additionally, the luminance preprocessor 112 may provide the location information to the display driving integrated circuit 120 through the mura generator 113 and the encoder 114.

Further in this regard, the luminance preprocessor 112 may adjust the luminance of the distortion region. That is, the luminance preprocessor 112 may adjust the luminance of the distortion region to generate the second luminance matrix LM2. The second luminance matrix LM2 may include a plurality of pre-processed luminance values respectively corresponding to the elements, wherein the pre-processed luminance values are greater than or equal to the first reference luminance value.

In some embodiments, the luminance preprocessor 112 may generate a pre-processed luminance value corresponding to a second non-luminance element of the second luminance matrix LM2 based on a luminance tendency of a plurality of elements adjacent to a first non-luminance element of the first luminance matrix LM1, wherein the first non-luminance element corresponds to the second non-luminance element. For example, when the first non-luminance element is located at a second row and an eighth column of the first luminance matrix LM1, the second non-luminance element may be located at a second row and an eighth column of the second luminance matrix LM2.

Here, the luminance tendency may refer to an increasing tendency or a decreasing tendency of raw luminance values for a plurality of elements adjacent to the first non-luminance element. In one illustrative example, it is assumed that a first non-luminance element is located at a second row and an eighth column of the first luminance matrix LM1, a raw luminance value of a first adjacent element located at a fifth row and the eighth column of the first luminance matrix LM1 is "9", a raw luminance value of a second adjacent element located at a fourth row and the eighth column of the first luminance matrix LM1 is "8", and a raw luminance value of a third adjacent element located at a third row and the eighth column of the first luminance matrix LM1 is "7". Under these assumptions, the luminance preprocessor 112 may determine a pre-processed luminance value of a second non-luminance element at the second row and the eighth column of the second luminance matrix LM2 to be "6".

It should be noted here that the foregoing description assumes that the luminance tendency of elements of the first luminance matrix LM1 located at the same column as the first non-luminance element is determined to generate a pre-processed luminance value of the second non-luminance element, however the scope of the inventive concept is not limited thereto. For example, it is possible to determine the luminance tendency of elements of the first luminance matrix LM1 located at the same row as the first non-luminance element, or to determine the luminance tendency of elements of the first luminance matrix LM1 located around the first non-luminance element.

The luminance preprocessor 112 may generate a pre-processed luminance value corresponding to a second curved element of the second luminance matrix LM2 based on a convergence luminance value and an average luminance value of a column in which a first curved element of the first luminance matrix LM1 is located. The first curved element may correspond to the second curved element. For example, when the first curved element is located at the second row and eighth column of the first luminance matrix LM1, the second curved element may be located at the second row and eighth column of the second luminance matrix LM2.

The average luminance value may be an average of raw luminance values of elements placed at the same column from among the elements of the first luminance matrix LM1. For example, when the first luminance matrix LM1 includes two columns, the luminance preprocessor 112 may calculate an average luminance value of raw luminance values of elements located at the first column of the first luminance matrix LM1 and an average luminance value of raw luminance values of elements located at the second column of the first luminance matrix LM1.

The convergence luminance value may be a value upon which a plurality of average luminance values of the first luminance matrix LM1 converge. For example, when an average luminance value of a first column is "1", an average luminance value of a second column is "2", an average luminance value of a third column is "6", an average luminance value of a fourth column is "6", and an average luminance value of a fifth column is "6", the luminance preprocessor 112 may determine the convergence luminance value of the first luminance matrix LM1 to be "6".

Based on a convergence luminance value and an average luminance value of the column in which the first curved element is located, the luminance preprocessor 112 may determine a gain value associated with the column in which the first curved element is located. Here, the gain value may be multiplied by a raw luminance value corresponding to the first curved element for the purpose of generating a pre-processed luminance value corresponding to the second curved element.

Extending the foregoing example, therefore, the average luminance value of the first column of the first luminance matrix LM1 is "1" and the convergence luminance value of the first luminance matrix LM1 is "6". The luminance preprocessor 112 may further determine a gain value of the first column of the first luminance matrix LM1 to be "6". Also, based on the foregoing, the average luminance value of the second column of the first luminance matrix LM1 is "2" and the convergence luminance value of the first luminance matrix LM1 is "6", and the luminance preprocessor 112 may determine a gain value of the second column of the first luminance matrix LM1 to be "3".

In some embodiments, the luminance preprocessor 112 may provide (or output) information indicating gain value(s), as determined for each column of the first luminance matrix LM1 to the display driving integrated circuit 120 through the mura generator 113 and the encoder 114.

The luminance preprocessor 112 may generate a pre-processed luminance value corresponding to the second curved element at the first column of the second luminance matrix LM2 by increasing a raw luminance value of the first curved element at the first column of the first luminance matrix LM1 as much as 6 times, based on that the gain value of the first column of the first luminance matrix LM1 is "6".

The luminance preprocessor 112 may generate a pre-processed luminance value corresponding to a second normal element of the second luminance matrix LM2, so as to be equal to a raw luminance value corresponding to a first normal element of the first luminance matrix LM1. The first normal element may correspond to the second normal element. For example, when the first normal element is at the second row and eighth column of the first luminance matrix LM1, the second normal element may be at the second row and eighth column of the second luminance matrix LM2.

Recognizing that data similarity between pre-processed luminance values of the second luminance matrix LM2 may be higher than data similarity between raw luminance values of the first luminance matrix LM1, the encoder 114 may generate the encoding data in which the tendency of luminance unevenness of the emission region is not distorted when compressing the mura matrix MM, which is generated based on the second luminance matrix LM2 in a dimensionality reduction scheme.

Figure 3:
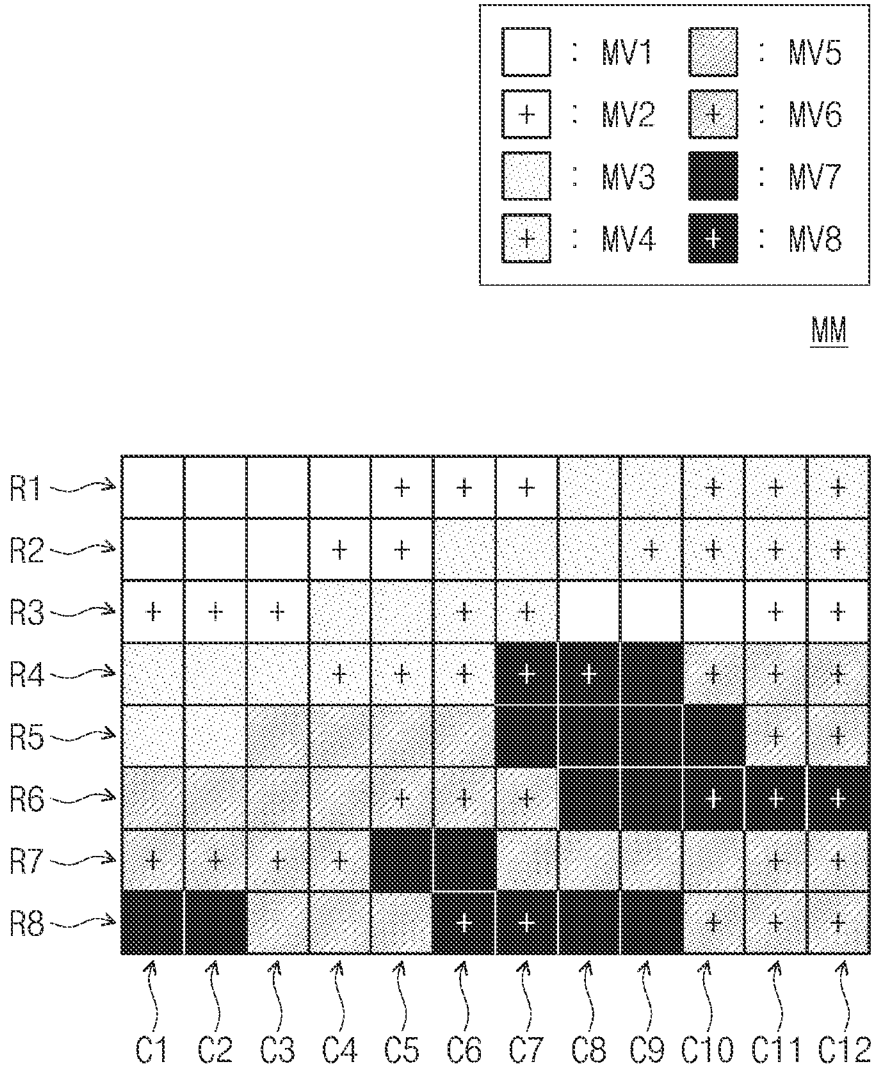
FIGS. 3, 4 and 5 are respective conceptual diagrams further illustrating exemplary aspects of a mura matrix, constituent mura data, and resulting encoded data according to various embodiments of the inventive concept.

FIG. 3 is another conceptual diagram illustrating a mura matrix MM according to embodiments of the inventive concept. Here, it is assume that the mura matrix MM of FIG. 3 was generated by the mura generator 113 of FIG. 1.

The mura generator 113 may calculate a difference between each of pre-processed luminance values of a second luminance matrix and a reference value and may generate the mura matrix MM as shown in FIG. 3 based on the calculated differences respectively associated with the pre-processed luminance values. For example, as illustrated in FIGS. 2 and 3, it is assumed that the second luminance matrix includes a plurality of elements arranged in the form of a matrix of dimension 8×12, but the inventive concept is not limited thereto.

That is, the mura matrix MM may include mura values respectively corresponding to the plurality of elements. The plurality of elements of the mura matrix MM may respectively correspond to the plurality of elements of the second luminance matrix. For example, in the case where the second luminance matrix includes a plurality of elements arranged in the form of a matrix of dimension 8×12, the mura matrix MM may include a plurality of elements arranged in the form of a matrix of dimension 8×12 so as to respectively correspond to the plurality of elements of the second luminance matrix.

A mura value may be a difference between a pre-processed luminance value and the reference value. The mura generator 113 may calculate a mura value corresponding to each of the plurality of elements of the mura matrix MM, based on the pre-processed luminance values of the second luminance matrix and the reference value. For example, the mura generator 113 may calculate a first mura value MV1, that is, a mura value of an element at the first row R1 and first column C1 of the mura matrix MM, based on a difference between the pre-processed luminance value and the reference value of the element at the first row and first column of the second luminance matrix.

Also, the mura generator 113 may calculate mura values of elements at the first row R1 and first to fourth columns C1 to C4 of the mura matrix MM, as the first mura value MV1. The mura generator 113 may calculate mura values of elements at the first row R1 and fifth to seventh columns C5 to C7 of the mura matrix MM, as a second mura value MV2. The mura generator 113 may calculate mura values of elements at the first row R1 and eighth and ninth columns C8 and C9 of the mura matrix MM, as a third mura value MV3. The mura generator 113 may calculate mura values of elements at the first row R1 and tenth to twelfth columns C10 to C12 of the mura matrix MM, as a fourth mura value MV4.

FIG. 3 is a conceptual diagram illustrating an exemplary 8×12 mura matrix MM, wherein each respective element has one of eight possible mura values (e.g., MV1 to MV8). That is, each element of the mura matrix MM may have a mura value that is determined by a difference between a reference value and a respective, pre-processed luminance value of the second luminance matrix LM2.

Figure 4:
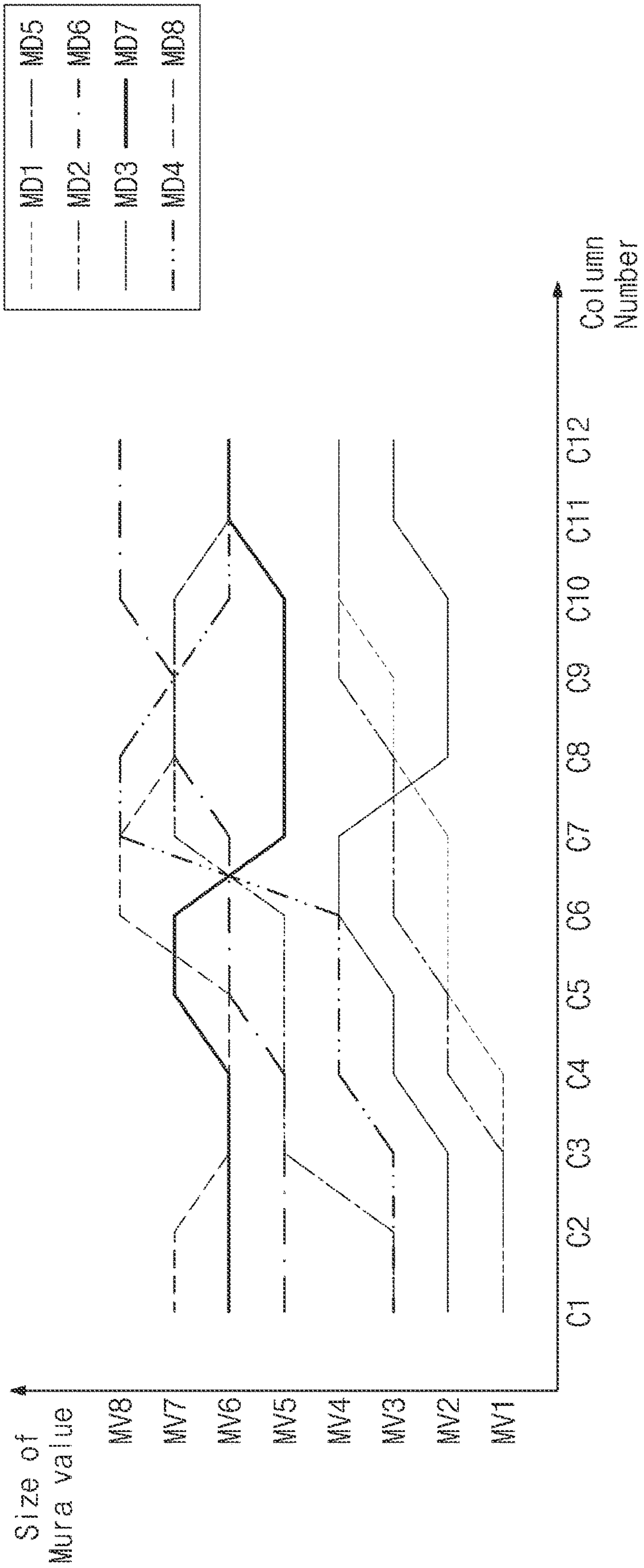

FIG. 4 is a graph further illustrating aspects of embodiments of the inventive concept in relation to the exemplary mura data of the mura matrix MM of FIG. 3. Here, the horizontal axis of the graph in FIG. 4 denotes a columnar positioning of element(s), and the vertical axis of the graph in FIG. 4 denotes a "size" (e.g., a relative numeric value) of a mura value.

Referring to FIGS. 3 and 4, first mura data MD1 is indicated by a dotted line, second mura data MD2 is indicated by a two dot-dash line, third mura data MD3 is indicated by a solid line, fourth mura data MD4 is indicated by a thick two dot-dash line, fifth mura data MD5 is indicated by a dot-dash line, sixth mura data MD6 is indicated by a thick dot-dash line, seventh mura data MD7 is indicated by a thick solid line, and eighth mura data MD8 is indicated by a thick dotted line.

Here, each respective "mura data" (e.g., first through eighth mura data MD1 to MD8) is assume to include elements belonging to a common row in the mura matrix MM of FIG. 3. Thus, in the working example, the first mura data MD1 may include elements belonging to a first row R1, the second mura data MD2 may include elements belonging to a second row R2, and so on, for all rows R1 to R8. However, this is just one example of an approach that may be used to variously define mura data. Alternately, for example, mura data may include elements belonging to a common column in the mura matrix MM of FIG. 3.

Accordingly, mura data may be understood as corresponding to selected mura values of a mura matrix, and may be expressed in relation to multidimensional vector(s). In this regard, an encoder (e.g., encoder 114 of FIG. 1) may be used to effective decrease the number of mura data by reducing the multi-dimensional vectors using an approach referred to as dimensionality reduction. Thus, the encoder may decrease the number of mura data based on the tendency of the multi-dimensional vectors. Further in this regard, in order to analyze the tendency of the multi-dimensional vectors, the encoder may determine a principal component vector of the multi-dimensional vectors.

Figure 5:
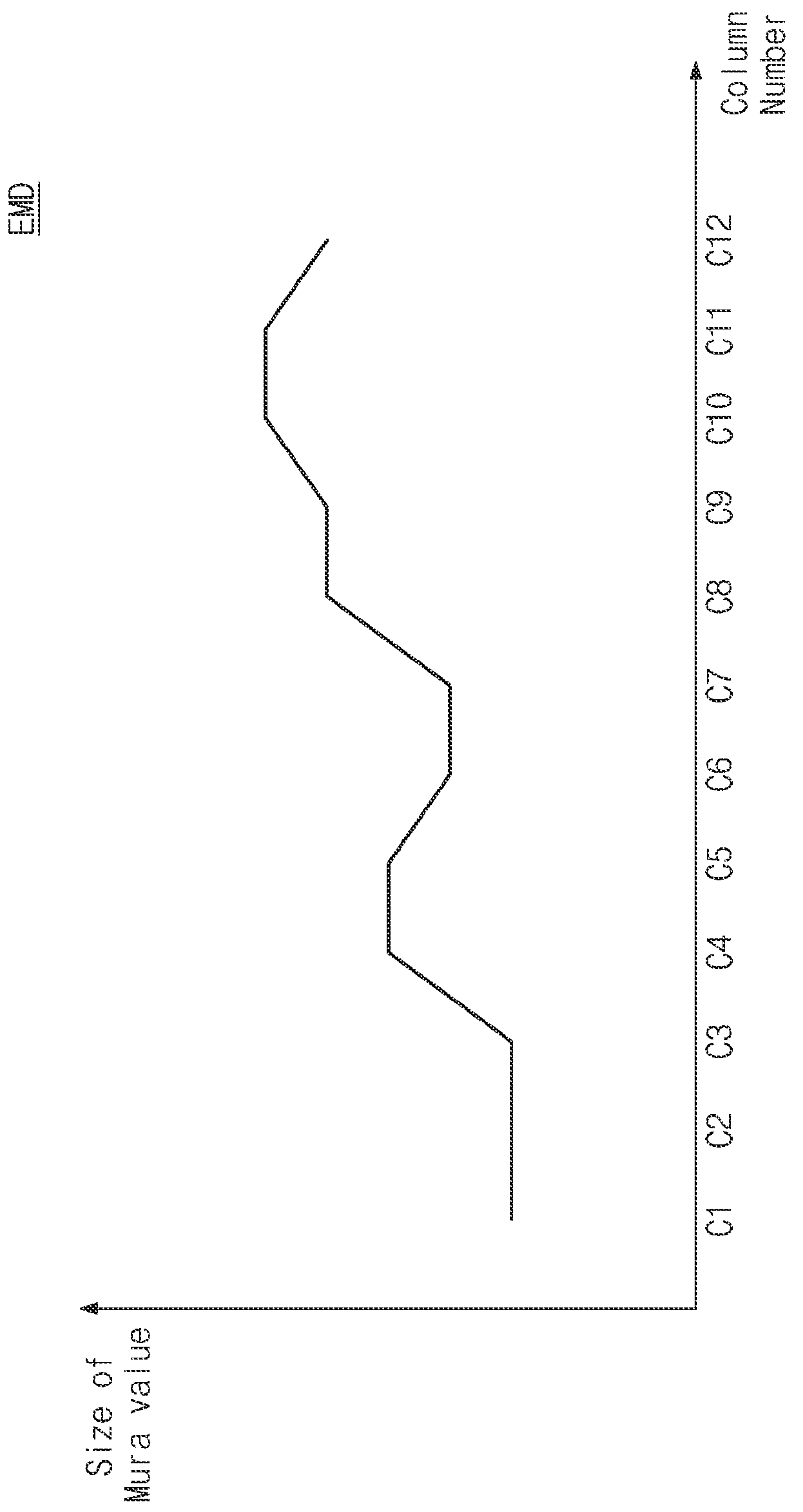

FIG. 5 is a graph further illustrating aspects of embodiments of the inventive concept in relation to encoding data (EMD) derived from the mura data graph of FIG. 4. Here, the horizontal axis of the graph of FIG. 5 denotes a columnar positioning of elements and the vertical axis denotes a size of respective mura values.

In order to perform dimensionality reduction, the encoder may determine a principal component vector based on multi-dimensional vectors corresponding to mura data. The principal component vector may be a vector indicating the tendency of mura data, and may correspond to the encoding data EMD.

In some embodiments, the principal component vector may be a "best vector" that best represents a distribution of mura values of a mura matrix MM. For example, the principal component vector may be a vector having a direction in which dispersion of the mura values of the mura matrix MM is relatively large (e.g., the principal component vector may be an eigenvector of the mura matrix MM).

The illustrated example of FIG. 5 (e.g., the encoding data EMD corresponding to the principal component vector) has been simplified for clarity, but in actual operation the encoder may determine a number of sub-vectors based on the principal component vector and a number of vectors. For example, one sub-vector may be a vector that is perpendicular to the principal component vector. In some embodiments, a sub-vector may be selected as a "next best vector" that well represents the distribution of the mura values of the mura matrix MM. Accordingly, the encoder may provide the principal component vector and at least one sub-vector as the encoding data EMD to a display driving integrated circuit.

The encoder may decrease the number of mura data by reducing multi-dimensional vectors based on the principal component vector and the plurality of sub-vectors. For example, the encoder may generate the encoding data EMD from the mura matrix MM using a Principal Component Analysis (PCA) method enabled by machine learning. That is, the encoding data EMD may be encoded mura data obtained by applying dimensionality reduction to mura data.

Extending the working example of FIGS. 3 and 4, the encoding data EMD obtained by applying dimensionality reduction to the mura data of the first to eighth rows illustrated in FIG. 4 are illustrated in FIG. 5. As the encoder performs compression based on the tendency of the multi-dimensional vectors, it may be possible to increase the compression ratio, as compared with conventional-provided, lossy compression techniques. That is, when conventional lossy compression is used, and as the compression ratio increases, an amount of data loss may increase (e.g., a practical limitation may exist for high compression ratios when a conventional lossy compression techniques is used).

In great contrast, when an encoder according to embodiments of the inventive concept is used to compress mura data (e.g., first to eighth rows of FIGS. 3 and 4) using dimensionality reduction, the resulting encoding data EMD may be generated without loss of data by analyzing the tendency of mura data, and compressing the mura data based on a corresponding analysis result. It follows that, when compared to the existing lossy compression techniques, it is possible to compress the mura data with a high compression ratio when using embodiments of the inventive concept. Accordingly, the size of the resulting encoding data may be reduced, an error rate for the subsequently obtained decoded data may decreased, and the luminance uniformity for a display device may ultimately be improved.

Since the size of the encoding data EMD may be reduced, the display driving integrated circuit 120 of FIG. 1 may acceptably operate in relation to the encoded data EMD using a relatively smaller memory (e.g., a memory having a reduced data storage capacity). And since the display driving integrated circuit 120 requires less memory space for encoded data EMD, a physically smaller memory may be used and the overall physical size of the display driving integrated circuit 120 may be reduced accordingly. Alternately or additionally, performance demands placed upon the memory by operations related to the encoded data EMD may be reduced, thereby freeing up system resources (e.g., memory space, bandwidth, processing time, etc.) for other operations.

As described above, because mura data are compressed based on a result of analyzing the tendency of the mura data, the encoding data EMD may be generated without data loss. Accordingly, a decoding mura matrix may be obtained that includes relatively more mura values than conventional schemes used to recover the encoding data EMD. Accordingly, the display driving integrated circuit 120 may perform more accurate mura compensation operations.

Figure 6A:
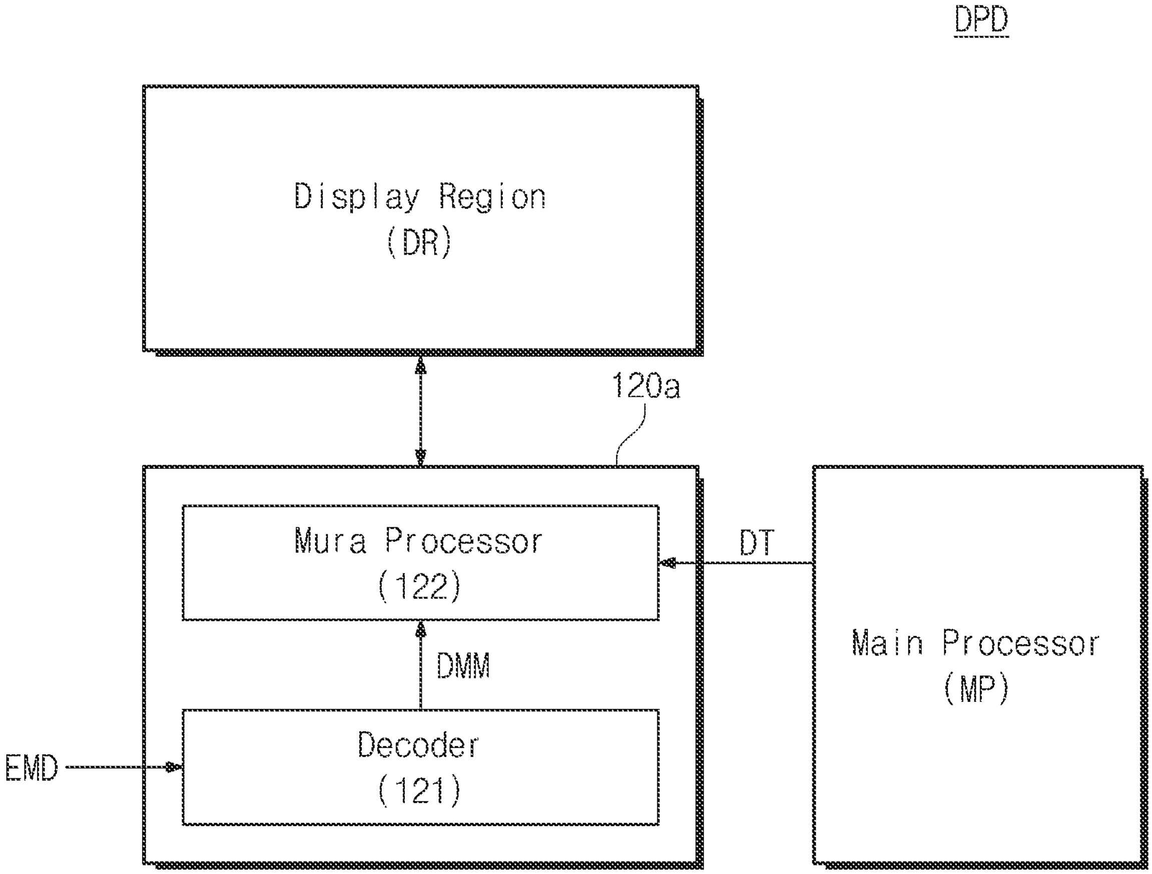
FIGS. 6A and 6B are respective block diagrams illustrating various display devices according to embodiments of the inventive concept.

FIG. 6A is a block diagram illustrating a display device according to embodiments of the inventive concept. Referring to FIG. 6A, a display device DPD may include the display region DPR, a display driving integrated circuit 120*a*, and a main processor MP. The display region DPR and the display driving integrated circuit 120*a* may respectively correspond to the display region DPR and the display driving integrated circuit 120 of FIG. 1.

The display device DPD may be an electronic device configured to provide various image information to the user (e.g., a television, a laptop computer, a tablet personal computer, a smartphone, etc.).

The main processor MP may generate data DT to be output to the display region DPR. The data DT may include image information to be provided to the user. For example, the main processor MP may be an application processor (AP) or a graphic processing unit (GPU).

The display driving integrated circuit 120*a* may include the decoder 121 and a mura processor 122. The decoder 121 may correspond to the decoder 121 of FIG. 1. The decoder 121 may be used to generate a decoding mura matrix DMM including recovery mura values by recovering dimension(s) of the encoding data EMD. The elements of the decoding mura matrix DMM may respectively correspond to elements of a mura matrix. For example, assuming that the mura matrix includes elements arranged in a 8×12 matrix, the decoding mura matrix DMM may include elements arranged in the 8×12 matrix corresponding to the elements of the mura matrix. Also, each of the recovery mura values may similarly and respectively correspond to one of the mura values.

The mura processor 122 may be used to perform the mura compensation operation on the data DT in relation to (or based on) the decoding mura matrix DMM. When the data DT may be output to the display region DPR, the mura processor 122 may adjust magnitudes of signals, which are output to light emitting elements, based on the recovery mura values. Accordingly, the display driving integrated circuit 120*a* may control the display region DPR, such that the display region DPR outputs the data DT with uniform luminance.

Figure 6B:
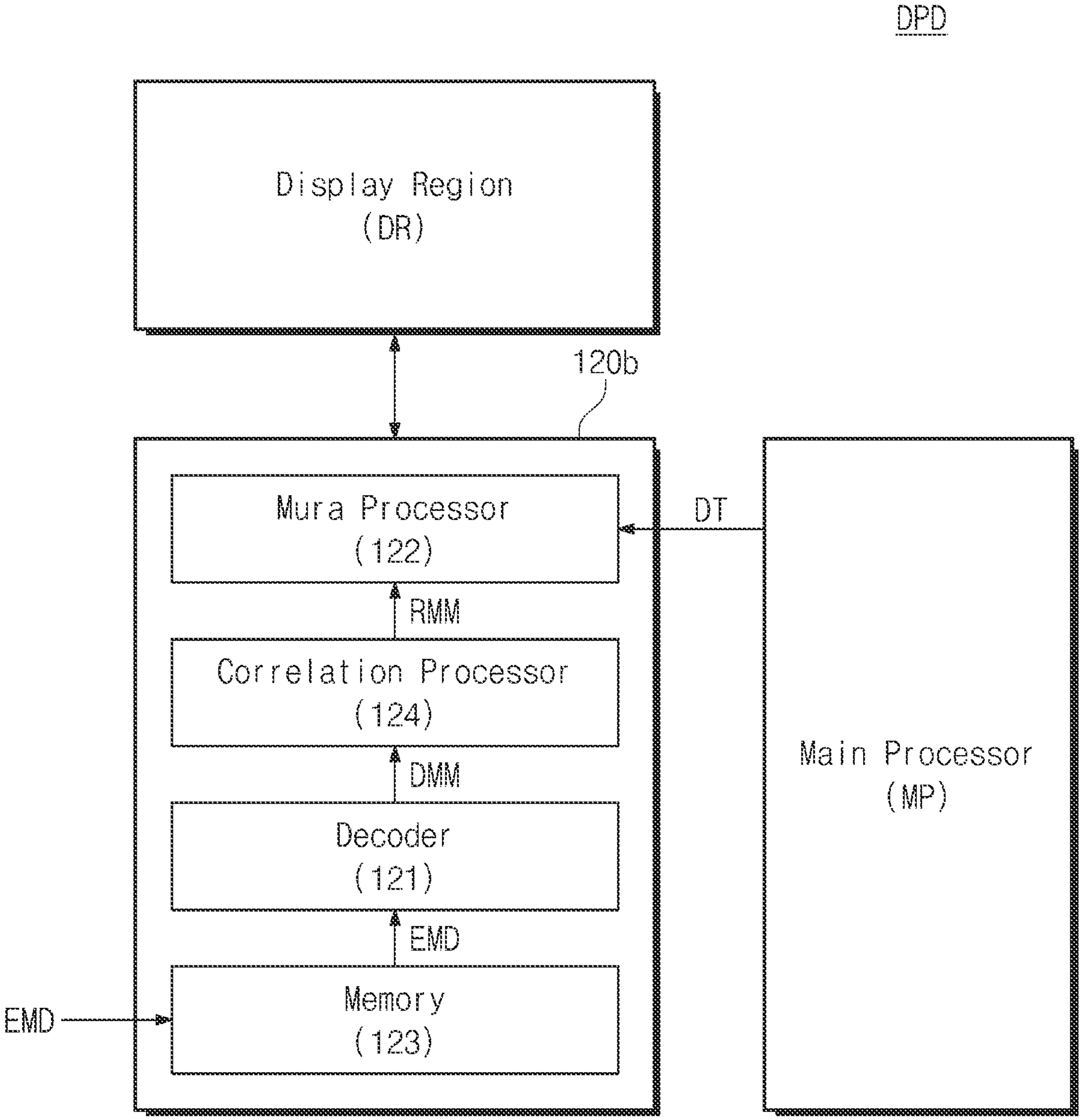

FIG. 6B is a block diagram illustrating a display device according to some embodiments of the inventive concept. Referring to FIG. 6B, a display device DPD may include the display region DPR, the decoder 121, a memory 123, and a correlation processor 124. The display region DPR and a display driving integrated circuit 120*b* may respectively correspond to the display region DPR and the display driving integrated circuit 120 of FIG. 1.

The display driving integrated circuit 120*b* may include the decoder 121, the mura processor 122, the memory 123, and the correlation processor 124. The decoder 121 and the mura processor 122 may respectively correspond to the decoder 121 and the mura processor 122 of FIG. 6A.

The memory 123 may be a general-purpose memory configured to perform operations associated with the display driving integrated circuit 120*b*. For example, the memory 123 may be used to store the encoding data EMD. Here, since the size of the generated encoding data EMD is relatively less than the size of data encoded using a conventionally-provided, lossy compression, the memory 123 may more readily secure a greater amount of free (or available) memory space, as compared with memory operations performed when data is encoded using a lossy compression technique.

The decoder 121 may generate the decoding mura matrix DMM including recovery mura values by recovering dimension(s) of the encoding data EMD.

The correlation processor 124 may perform a correlation operation on the recovery mura values, wherein the term "correlation operation" refers to an operation of recovering a mura value generated based on a pre-processed luminance value corresponding to a curved element to a mura value generated based on a raw luminance value corresponding to the curved element.

Curved elements among the elements of the decoding mura matrix DMM may be determined based on location information. Further in this regard, the correlation processor 124 may perform the correlation operation on recovery mura values respectively corresponding to the curved elements in relation to (or based on) gain information.

The correlation processor 124 may generate a recovery matrix RMM by performing the correlation operation on the decoding mura matrix DMM based on the location information and the gain information. For example, assuming a case wherein a gain value for a first column of a first luminance matrix is "6", "1/6" may be multiplied by a recovery mura value of a curved element at the first column of the decoding mura matrix DMM. For convenience of description, an example in which "1/6" is multiplied by a recovery mura value when a gain value is "6" is disclosed, but the inventive concept is not limited thereto. For example, a value that is multiplied by a recovery mura value may be determined based on a curvature of a curved region and gain information.

The mura processor 122 may perform the mura compensation operation on the data DT based on the recovery matrix RMM.

Figure 7:
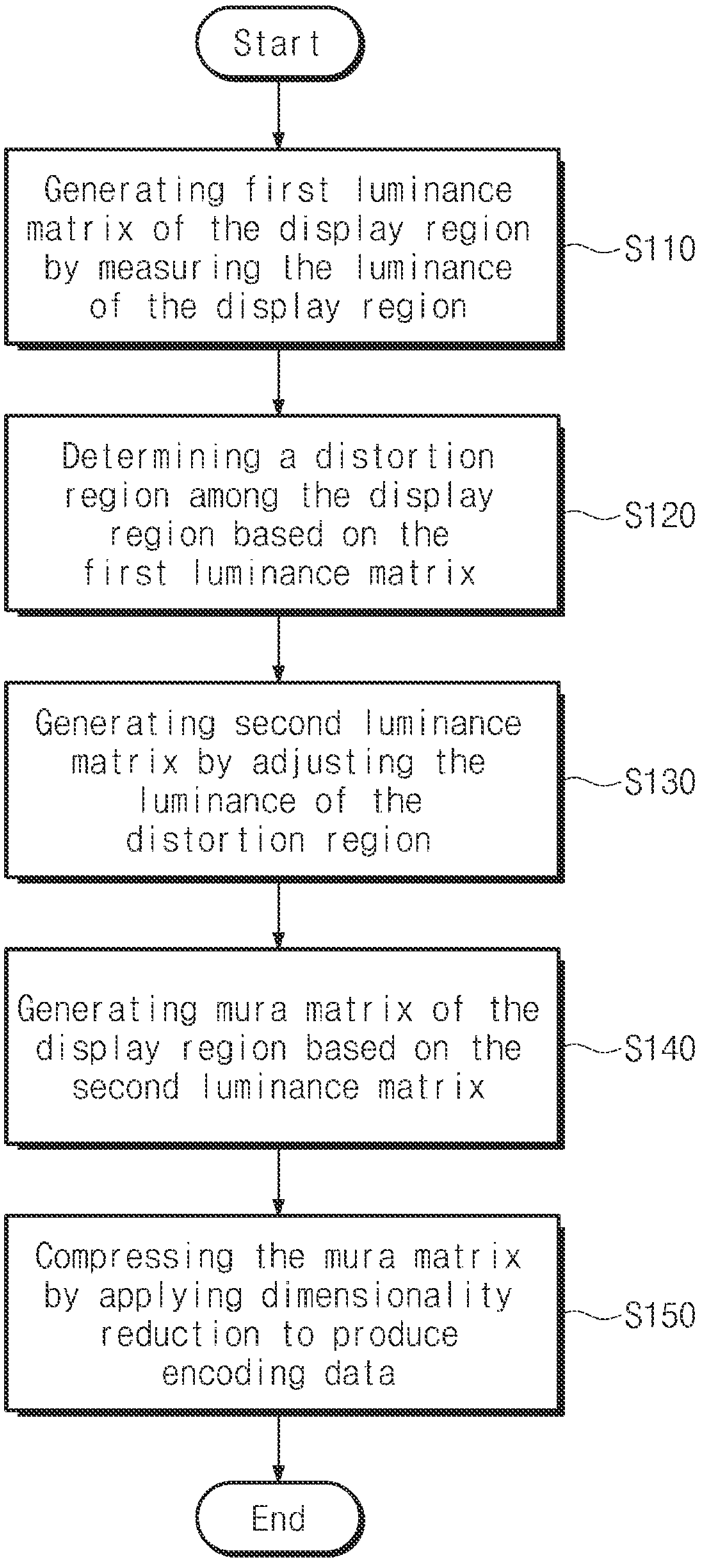
FIG. 7 is a flowchart illustrating an operating method for a mura inspection device according to embodiments of the inventive concept.

FIG. 7 is a flowchart illustrating operation of a mura inspection device according to embodiments of the inventive concept in the context of the mura inspection device 110 of FIG. 1.

The mura inspection device 110 may measure luminance of the display region DPR in order to generate the first luminance matrix LM1 of the display region DPR (S110). Here, the first luminance matrix LM1 may include first elements, wherein each first element corresponds to a raw luminance value, among a range of possible, raw luminance values.

Then, the mura inspection device 110 may detect a distortion region of the display region DPR in relation to (or based on) the first luminance matrix LM1 (S120). That is, the mura inspection device 110 may determine distorted elements corresponding to the distortion region from among the first elements of the first luminance matrix LM1. In this context, the mura inspection device 110 may determine that a first element having a raw luminance value less than a given first luminance value is a distorted element.

The mura inspection device 110 may adjust luminance of the distortion region in order to generate the second luminance matrix LM2 (S130). Here, in some embodiments, the second elements of the second luminance matrix LM2 may correspond, element-for-element with first elements of the first luminance matrix LM1. In effect, the second luminance matrix LM2 may include pre-processed luminance values (second elements), respectively corresponding to the first elements of the first luminance matrix LM1.

Then, the mura inspection device 110 may generate the mura matrix MM in relation to a difference between second elements of the second luminance matrix LM2 and the reference value (S140). Thus here, in some embodiments, elements of the mura matrix MM (e.g., "mura values") may correspond, element-for-mura value, with second elements of the second luminance matrix LM2. Hence, the mura matrix MM may include mura values respectively corresponding to the second elements, and the first elements. In this regard, the mura inspection device 110 may calculate mura values based on differences between the second elements (e.g., the pre-processed luminance values) of the second luminance matrix LM2 and the reference value.

Then, the mura inspection device 110 may generate (or produce) the encoding data EMD by applying the dimensionality reduction to the mura matrix MM (S150). In some embodiments, the mura inspection device 110 may express the mura values of the mura matrix MM using multi-dimensional vectors. The mura inspection device 110 may decrease a number of mura data by reducing the multi-dimensional vectors based on dimensionality reduction. That is, the mura inspection device 110 may decrease a number of mura data based on the tendency of the multi-dimensional vectors. For example, the mura inspection device 110 may generate encoding data EMD from the mura matrix MM using a Principal Component Analysis (PCA) method. That is, the encoding data EMD may be encoded mura data obtained by applying the dimensionality reduction to the mura data.

In certain embodiments of the inventive concept, a mura inspection device may be used to compress a mura matrix through dimensionality reduction. This approach may be used in related operating methods, as well as display systems including same.

In certain embodiments of the inventive concept, as the display system applies dimensionality reduction, the size of resulting encoding data may be reduced, error rate for the decoded data may decrease, and luminance uniformity of a display device may be improved.

While the inventive concept has been described with reference to embodiments thereof, it will be apparent to those of ordinary skill in the art that various changes and modifications may be made thereto without departing from the spirit and scope of the inventive concept as set forth in the following claims.

What is claimed is:

1. A mura inspection device comprising:

an optical meter configured to measure luminance of a display region and generate a first luminance matrix;

a luminance preprocessor configured to detect a distortion region of the display region in relation to the first luminance matrix, and generate a second luminance matrix by adjusting luminance of the distortion region;

a mura generator configured to generate a mura matrix in relation to a difference between the second luminance matrix and a reference value; and an encoder configured to generate encoding data by applying dimensionality reduction to the mura matrix, wherein the first luminance matrix includes a plurality of first elements respectively having a plurality of raw luminance values, and the luminance preprocessor is further configured to identify a first element among the plurality of first elements as a distorted element of the first luminance matrix corresponding to the distortion region, the identified first element having a raw luminance value less than a first luminance value, wherein when the raw luminance value of the distorted element is greater than or equal to a second luminance value less than the first luminance value, the luminance preprocessor is further configured to calculate an average luminance value of a column including the distorted element, calculate a convergence luminance value of the plurality of first elements, and determine a pre-processed luminance value corresponding to a distorted element in the second luminance matrix in relation to a difference between the average luminance value and the convergence luminance value, and wherein the distorted element in the second luminance matrix corresponds to the distorted element of the first luminance matrix.

2. The mura inspection device of claim 1, wherein when the raw luminance value of the distorted element is less than the second luminance value, the luminance preprocessor is further configured to:

determine a luminance tendency for the first elements adjacent to the distorted element; and determine a pre-processed luminance value corresponding to a distorted element in the second luminance matrix in relation to the luminance tendency, wherein the distorted element of the second luminance matrix corresponds to the distorted element of the first luminance matrix.

3. The mura inspection device of claim 1, wherein the luminance preprocessor is further configured to:

identify another first element among the first elements as a normal element of the first luminance matrix, the other first element having a raw luminance value greater than or equal to the first luminance value; and determine a pre-processed luminance value corresponding to a normal element of the second luminance matrix as the raw luminance value of the normal element of the first luminance matrix, wherein the normal element in the second luminance matrix corresponds to the normal element of the first luminance matrix.

4. The mura inspection device of claim 1, wherein a first luminance similarity between the distortion region and a normal region in the second luminance matrix is greater than a second luminance similarity between the distortion region and a normal region in the first luminance matrix.

5. The mura inspection device of claim 1, wherein a size of the encoding data is less than a size of data generated by applying a lossy compression to the mura matrix.

6. The mura inspection device of claim 1, wherein the encoder is further configured to communicate the encoding data to a display driving integrated circuit controlling the display region.

7. The mura inspection device of claim 1, wherein applying dimensionality reduction to mura data of the mura matrix comprises determining a principal component vector in relation to vectors corresponding to the mura data, and determining at least one sub-vector in relation to the principal component vector and the vectors, and wherein the encoding data includes the principal component vector and the at least one sub-vector.

8. A display system comprising:

a display device including a display region; and a mura inspection device, wherein the mura inspection device is configured to:

measure luminance of the display region to generate a first luminance matrix including a plurality of first elements respectively having a plurality of raw luminance values;

detect a distortion region of the display region in relation to the first luminance matrix;

adjust luminance of the distortion region to generate a second luminance matrix;

generate a mura matrix in relation to a difference between the second luminance matrix and a reference value;

generate encoding data by applying dimensionality reduction to the mura matrix; and communicate the encoding data to the display device, wherein the mura inspection device is further configured to identify a first element among the plurality of first elements as a distorted element of the first luminance matrix corresponding to the distortion region, the identified first element having a raw luminance value less than a first luminance value, wherein, when the raw luminance value of the distorted element of the first luminance matrix is greater than or equal to a second luminance value less than the first luminance value, the mura inspection device is further configured to calculate an average luminance value of a column including the distorted element of the first luminance matrix, calculate a convergence luminance value for the plurality of first elements, and determine a pre-processed luminance value corresponding to a distorted element of the second luminance matrix in relation to a difference between the average luminance value and the convergence luminance value, and wherein the distorted element of the second luminance matrix corresponds to the distorted element of the first luminance matrix.

9. The display system of claim 8, wherein, when the raw luminance value of the distorted element of the first luminance matrix is less than the second luminance value, the mura inspection device is further configured to:

determine a luminance tendency of a first element adjacent to the distorted element of the first luminance matrix; and determine a pre-processed luminance value corresponding to a distorted element of the second luminance matrix in relation to the luminance tendency, wherein the distorted element of the second luminance matrix corresponds to the distorted element of the first luminance matrix.

10. The display system of claim 8, wherein the display device is configured to:

recover a dimension of the encoding data to generate a plurality of decoding mura values;

determine one decoding mura value among the plurality of decoding mura values corresponding to the distorted element of the second luminance matrix in relation to location information of the distorted element of the second luminance matrix; and perform a correlation operation on the one decoding mura value to generate a correlation mura value, wherein the correlation mura value corresponds to a mura value generated in relation to a raw luminance value corresponding to the distorted element of the first luminance matrix corresponding to the distorted element of the second luminance matrix.

11. The display system of claim 8, wherein a first luminance similarity between the distortion region and a normal region of the second luminance matrix is greater than a second luminance similarity between the distortion region and a normal region of the first luminance matrix.

12. The display system of claim 8, wherein the display device is configured to:

recover a dimension of the encoding data to generate a decoding mura matrix including decoding mura values; and compensate for luminance of the display region in relation to the decoding mura matrix.

13. The display system of claim 8, wherein applying dimensionality reduction to mura data of the mura matrix comprises determining a principal component vector in relation to vectors corresponding to the mura data, and determining at least one sub-vector in relation to the principal component vector and the vectors, and wherein the encoding data includes the principal component vector and the at least one sub-vector.

14. A method of operating a mura inspection device measuring luminance of a display region, the method comprising:

generating a first luminance matrix of the display region, wherein the first luminance matrix includes a plurality of first elements respectively having, a plurality of raw luminance values;

detecting a distortion region of the display region in relation to the first luminance matrix;

adjusting a luminance of the distortion region to generate a second luminance matrix;

generating a mura matrix in relation to a difference between the second luminance matrix and a reference value;

generating encoding data by applying dimensionality reduction to the mura matrix;

wherein the detecting comprises identifying a first element among the plurality of first elements as a distorted element of the first luminance matrix corresponding to the distortion region, the identified first element having a raw luminance value less than a first luminance value, wherein, when the raw luminance value of the distorted element of the first luminance matrix is greater than or equal to a second luminance value less than the first luminance value, the method further comprises calculating an average luminance value of a column including the distorted element of the first luminance matrix, calculating a convergence luminance value for the plurality of first elements, and determining a pre-processed luminance value corresponding to a distorted element of the second luminance matrix in relation to a difference between the average luminance value and the convergence luminance value, and wherein the distorted element of the second luminance matrix corresponds to the distorted element of the first luminance matrix.

15. The method of claim 14, wherein a first luminance similarity between the distortion region and a normal region of the second luminance matrix is greater than a second luminance similarity between the distortion region and a normal region of the first luminance matrix.

16. The method of claim 14, further comprising:

communicating the encoding data to a display driving integrated circuit controlling the display region.

17. The method of claim 14, wherein applying dimensionality reduction to mura data of the mura matrix comprises determining a principal component vector in relation to vectors corresponding to the mura data, and determining at least one sub-vector in relation to the principal component vector and the vectors, and wherein the encoding data includes the principal component vector and the at least one sub-vector.

* * * * *